PHONOGRAPH REPRODUCER

Filed Dec. 10, 1957 2 Sheets-Sheet 1

INVENTOR
C. C. DAVIS
BY J. F. McEneany
ATTORNEY

July 28, 1964 C. C. DAVIS 3,142,729

PHONOGRAPH REPRODUCER

Filed Dec. 10, 1957 2 Sheets-Sheet 2

INVENTOR
C. C. DAVIS
BY
J. F. McEneany
ATTORNEY

United States Patent Office 3,142,729

Patented July 28, 1964

3,142,729

PHONOGRAPH REPRODUCER

Charles C. Davis, Los Angeles, Calif., assignor to Litton Systems, Inc., a corporation of Maryland Filed Dec. 10, 1957, Ser. No. 701,872
32 Claims. (Cl. 179—100.41)

This invention relates to phonograph reproducers and particularly to improvements in such devices employing a plurality of transducer elements each operable in response to movement of a single record engaging stylus.

It is an object of this invention to provide a single stylus, plural transducer phonograph reproducer capable of faithfully reproducing separable sounds recorded in a single groove of a record.

A further object of the invention is to provide a single stylus, plural transducer phonograph reproducer in which the moving system thereof has mass and compliance characteristics comparable to the best single transducer phonograph reproducers now available.

A feature of the invention resides in the provision of a phonograph reproducer employing two moving coil transducers which are pivotally supported at equal angles to the vertical axis of the stylus in such manner that the mass of each coil is effective at the stylus only when stylus motion is directed toward that particular coil and in which the stylus is supported in the free end of an anchored, hollow cylindrical tube having negligible stiffness for movement of the stylus in desired modes but high torsional stiffness to resist undesired rotational movement of the stylus.

This invention is directed to a phonograph reproducer suitable for the reproduction of a sound record made in accordance with the system of recording described in United States Patent 2,114,471, April 19, 1938, to A. C. Keller and I. S. Rafuse. In the recording system disclosed in this patent, two separable recordings are made in a single groove of a record by a single stylus which vibrates in two planes at an angle to each other and at equal angles to the axis of the stylus. This recording system is useful in the stereophonic recording of sound. The sounds from two stereophonically related channels may be separately recorded in a single record groove without quality differences in the two recordings.

The provision of a reproducer capable of faithfully reproducing the two separable sound tracks without loss throughout the desired frequency range, has presented many problems. Since record wear and tracking errors increase rapidly with increased mass as presented by the stylus, it is necessary to provide a reproducer in which the effective mass of the moving system of a plural transducer reproducing unit does not exceed that of the best available reproducer employing one transducer only. Further, the compliance of the moving system including the stylus and stylus supporting means must be such that stylus movements are faithfully transmitted to the plurality of transducer elements throughout the entire frequency range of the recorded sounds.

As distortion products are inherently low in moving coil reproducers and as less accuracy is required in centering this type reproducer as compared to other types, applicant selected the moving coil type transducer as most suitable. The reproducer in accordance with this invention incorporates novel coil and stylus mounting features which provide the mass and compliance characteristics necessary to the faithful reproduction of each of two separable sounds recorded in a single track of a record.

The invention will be more clearly understood from the following specification when read in connection with the accompanying drawings in which.

Figure 1:
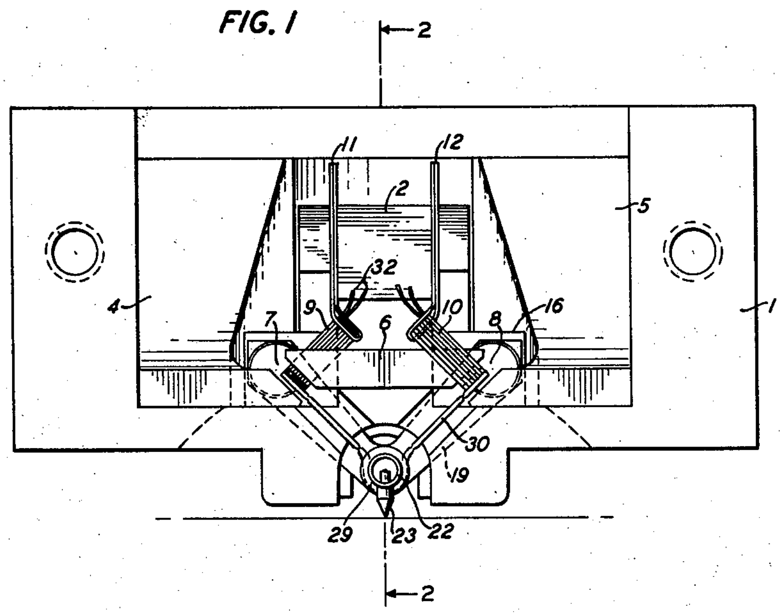
FIG. 1 is a front elevation of the reproducer with the front cover removed.

Referring to FIG. 1, numeral 1 indicates an aluminum casting having an integral, centrally located upright portion 2. This aluminum casting 1 constitutes a housing for the magnet system and moving elements of a phonograph reproducer in accordance with this invention.

The magnet system comprises a permanent magnet 3, end polepieces 4 and 5 and centrally disposed polepiece 6, all forming a pair of oblique air-gaps 7 and 8. The magnet 3 and the polepieces 4, 5 and 6 may be press-fitted in or otherwise secured in the housing 1.

A pair of multisided coil transducers 9 and 10 are each disposed with one side thereof in one of the air-gaps 7 and 8. Each of the coils 9 and 10 is pivotally supported from the element 2 of the housing 1 by means shown particularly in FIG. 1. Strips of material 11 and 12 are each looped about the coils 9 and 10 at the side of the coil opposite the side thereof disposed in an air-gap in the magnet system. A suitable cement is applied between each strip and its associated coil. The strip material selected for this mounting must have sufficient stiffness to support its associated coil in the angular position shown, with one side thereof immersed in the magnetic field of an air-gap. Also, the material employed must have sufficient flexibility at the pivot point to permit relatively free movement of a coil in its air-gap about this pivotal mounting in response to a force applied to the free end of the coil. A material which has been found suitable for the coil mounting strips 11 and 12 is polyethylene terephthalate, which is a polyester sold under the name of "Mylar."

An aluminum clamp 14 is provided for securing the coil mounting strips 11 and 12 to the casting element 2. Following adjustment of the strips 11 and 12, such that the looped ends thereof extending below element 2 properly locate one side of each coil 9 and 10 in its associated air-gap, the ends of clamp 14 are urged into clamping engagement with strips 11 and 12 by movement of a screw 15, which extends through clamp 14. Clamp 14 is secured to an aluminum block 16 by means of a screw 17.

A V-shaped, flat spring element 19, which is secured to element 16 by means of screws 20 and 21, provides an anchoring support for one end of a hollow cylindrical tube 22. Tube 22 constitutes the supporting beam for a record engaging stylus 23 mounted in the freely movable end of this tube.

The hollow cylindrical cantilever tube 22 has low radial stiffness to thus permit free movement of the stylus 23 in the desired modes in response to force exerted on the stylus by record undulations. Further, the tube 22 has high torsional stiffness to prevent undesired rotational movement of the stylus. Thus stylus movement is constrained to the modes required for faithful reproduction of each of two sounds recorded in a single record groove. The V-shaped spring 19, to which the tube 22 is anchored, will flex sufficiently at the anchoring point to enhance free movement of the tube in the desired modes but will resist undesired rotational movement of the tube at this anchoring point.

To prevent movement of the stylus 23 in the direction of the record groove, there is provided a light drag wire 25 (FIG. 2), one end of which is cemented to the underside of housing 1 at 26 and the other end of which is cemented in the central bore of an element 27, which is press-fitted or otherwise secured in the anchored end of tube 22.

The exterior surface of the hollow rod 22 is provided near the free end thereof with a grooved, radially projecting portion 29. A copper wire 30, formed as shown particularly in FIG. 1, is held in the groove in projection 29 with the arms thereof extending from the tube 22 at equal angles to the vertical axis of the stylus 23. The end of each arm of the element 30 extends into one of the magnet system air-gaps and is attached by suitable means to the side of the coil located in the air-gap. The angularly extending arms of element 30, therefore, provide a rigid driving connection between the stylus and each of the coils for motion of the stylus directed toward each coil. However, each connecting arms of the element 30 must be bendable so that the stylus may impart motion to one of the transducer coils through its associated connection without interference from the connection to the other transducer coil. This may be accomplished in practice by providing sections of reduced stiffness in each connecting arms which will permit the necessary flexing or bending thereof in response to a stylus force other than one applied directly toward its associated coil.

Figure 2:
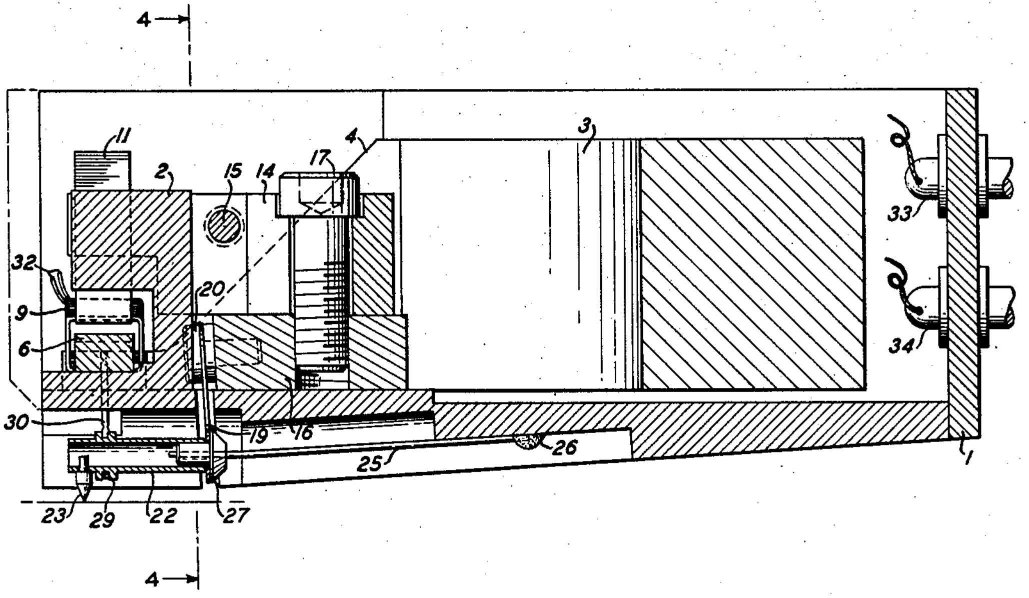
FIG. 2 is a section taken along line 2—2 of FIG. 1.
Figure 3:
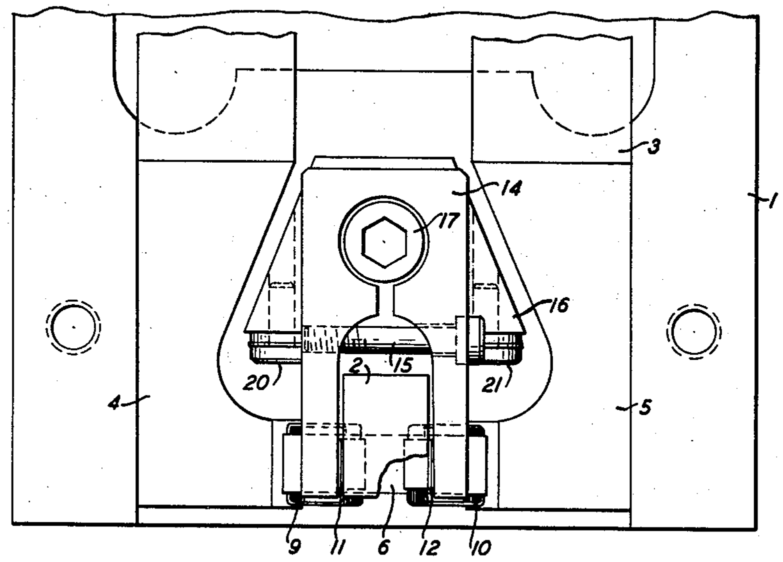
FIG. 3 is a plan view of the reproducer with the top cover removed.
Figure 4:
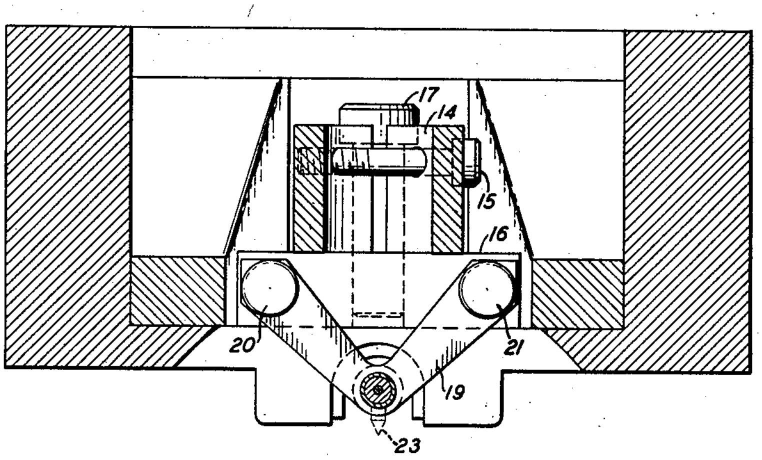
FIG. 4 is a section taken along line 4—4 of FIG. 2.

The coil leads are each electrically connected to terminals mounted on the housing. As shown in FIG. 2, the leads 32 of coil 9 are connected to terminals 33 and 34, which are secured in the rear wall of housing 1. A similar connection is made from the leads of coil 10 to additional terminals (not shown) on this rear wall of the housing 1.

The entire unit as shown in the drawings is mounted in operable position on the tone arm of a suitable record reproducing apparatus.

In an operable reproducer constructed by applicant in accordance with this invention, there are provided a pair of squared coils each .070 inch by 0.70 inch wound with 25 turns of No. 44 wire having a width of .028 inch, each presenting an effective mass of 1.3 milligrams and an impedance of 2.5 ohms. At 3 cm. per second velocity in a magnetic air-gap having a flux density of 2500 gauss, the coil gives an output of 4.5 millivolts when operated through a 15 to 1 voltage step-up transformer. This represents 79 db signal-to-noise ratio referred to .5 microvolt.

The novel stylus support and transducer coil mounting arrangement in accordance with this invention, provides a multiple coil transducer phonograph reproducer, the moving system of which has the high compliance and low effective mass required in a unit of this type capable of faithfully transmitting stylus motion to the coils with little loss throughout an extended frequency range and with a minimum of record wear.

The novel coil mounting arrangement provided in this reproducer contributes greatly to the substantial reduction in the effective mass of a moving system having two transducers in that the mass of each coil is effective at the stylus only when stylus motion is directed toward that particular coil. Also, this coil arrangement permits of a more simplified coil mounting, the use of a somewhat larger and more practical coil and a simplified polepiece construction.

What is claimed is:

1. In a phonograph reproducer, a vertically disposed stylus, a normally stationary structure including a magnet system having two separate air-gaps located on opposite sides of and disposed at equal angles to the vertical axis of said stylus, a pair of moving coil transducers each having a limited section thereof disposed for movement in one of the air-gaps in said magnet system, means secured to said stationary structure for pivotally supporting each said coil in a manner permitting independent movement of the limited section thereof in its associated magnetic air-gap, and a separate unitary driving connection from said stylus to the section of each said coil disposed in the air-gaps formed by said magnet system.

2. The combination in a phonograph reproducer having a normally stationary structure and a vertically disposed record engaging stylus movable relative thereto, of a pair of moving coil transducers located on opposite sides of and disposed at equal angles to the axis of said stylus, a separate unitary driving connection from said stylus to each said coil, a magnet system secured to said stationary structure, said magnet system forming a separate air-gap about an intermediate portion of each said coil including the portion thereof engaged by said stylus driving connection, and means secured to said stationary structure and engaging each said coil at a point removed from the magnet system air-gaps adapted to provide a separate pivotal support for each said coil permitting independent movement of the intermediate portion of each said coil in its associated air-gap in response to movement of said record engaging stylus without thereby imparting motion to the other of said coils.

3. In a phonograph reproducer, a normally stationary structure, a magnet system secured to said structure and forming two obliquely disposed air-gaps, a pair of moving coil transducers each having an intermediate portion thereof disposed in one of the air-gaps in said magnet system, means secured to said structure and engaging each said coil to form a pivotal support therefor at a point opposite the intermediate portion of each said coil disposed in said magnet system air-gaps, a vertically disposed stylus located below and midway between said magnet system air-gaps, a support for said stylus comprising a horizontally disposed hollow cylindrical cantilever tube, means for anchoring one end of said tube to said structure, and a separate driving connection between the freely movable end of said tube and the intermediate portion of each said coil disposed in a magnet system air-gap.

4. In a phonograph reproducer, a normally stationary structure, a horizontally disposed hollow cylindrical tube having one end thereof anchored to said structure and the other end movable freely in all directions radially of said one end, a vertically disposed stylus secured in the freely movable end of said tube, a pair of multisided coil transducers, a pair of driving connections extending from the freely movable end of said tube at equal angles to the vertical axis of said stylus, each said driving connection engaging a side of one of said coils, a magnetic circuit mounted on said structure defining two air-gaps, one at each of the coils about the side thereof engaged by its associated driving connection from said tube, means comprising two strips of flexible material depending from said stationary structure and secured to each of said coils at the side thereof opposite the side immersed in an air-gap in said magnetic circuit to provide a pivotal support permitting movement of one side of each said coil in its associated air-gap in response to movement of said stylus, and means connecting each said coil to an electrical reproducing circuit.

5. The reproducer defined in claim 3, wherein said means for anchoring said tube to said structure is adapted to permit relatively free radial movement of the stylus about said anchoring means while augmenting the torsional stiffness of the tube to prevent rotational movement of the stylus.

6. In a phonograph pickup device for playing back a record groove containing two different record undulation sequences extending along different transverse segments of the groove, a stylus arranged to engage the record groove and to be driven by both its undulation sequences, and a moving system including at least two mechano-electric transducer elements each having a motion-transmitting connection to said stylus and operative to transduce transmitted motion of said stylus into electric signals, a mounting structure carrying said moving system and said stylus in their operative positions and supporting said stylus for vibration simultaneously in two different transverse planes, said moving system having two relatively rigid drive links, one for each transducer element, with each drive link extending in a different direction from and having a pivotal motion-transmitting connection to said stylus for transmitting motion of said stylus to its transducer elements and a guided portion at a distance from said stylus, two distinct elements of said moving system forming two relatively rigid guide links with one guide link for each drive link having a pivot portion pivotally connected to the guided portion of its drive link and a further pivot portion pivotally connected to said mounting structure, said two drive links and said two guide links constituting a link chain of at least four pivotally connected motion-transmitting links extending from said stylus and operative to confine the motion of each drive link to a distinct direction irrespective of the amplitude of motion transmitted therethrough to its transducer by said stylus.

7. In a pickup device as claimed in claim 6, the further pivot portion of each of said two guide links being pivotally connected to two spaced portions of said mounting structure.

8. In a pickup device as claimed in claim 6 said four pivotally connected links forming sections of a common integral link structure.

9. In a pickup device as claimed in claim 6, said four pivotally connected links forming link sections of a common integral link structure with all links pivotally joined into an endless link chain.

10. In a pickup device as claimed in claim 6, said two drive links forming sections of a common integral link structure.

11. In a pickup device as claimed in claim 6, a portion of each of the respective two transducer elements forming at least part of said link chain through which said transducers elements are connected to the stylus.

12. In a pickup device as claimed in claim 6, a portion of each of the respective two transducer elements forming one link of the link chain through which said transducer elements are connected to said stylus.

13. In a pickup device as claimed in claim 6, said mounting structure supporting said stylus for vibration in two transverse planes forming equal angles with the axis of said stylus, said two drive links extending in different directions from and under equal angles to the axis of the stylus, said four pivotally connected links forming sections of a common integral link structure.

14. In a pickup device as claimed in claim 6, said mounting structure supporting said stylus for vibration in two transverse planes and forming equal angles with the axis of said stylus, said two drive links extending in different directions from and under equal angles to the axis of the stylus, said four pivotally connected links forming link sections of a common integral link structure with all links pivotally joined into an endless link chain.

15. In a pickup device as claimed in claim 6, said stylus forming part of an elongated drive member detachably held by said mounting structure, said link chain having a coupling portion arranged to detachably engage an element of said drive member for coupling said stylus to said drive links and therethrough to said transducers when said drive member is connected to said mounting structure.

16. In a pickup device as claimed in claim 15, said coupling portion being relatively rigid and having pivotal connections to the two drive links which constitute the pivotal connections of said drive links to said stylus.

17. In a pickup device as claimed in claim 6, said mounting structure supporting said stylus for vibration in two transverse planes forming equal angles with the axis of said stylus.

18. In a pickup device as claimed in claim 17, said two drive links extending in different directions from and under equal angles to the axis of the stylus.

19. The phonograph pick-up device set forth in claim 18 including a substantially horizontally disposed cylindrical cantilever tube supporting said stylus, said tube having relatively high torsional stiffness, and anchoring support means for anchoring said tube to said mounting structure, said anchoring support means being adapted to permit relatively free radial movement of said stylus while augmenting the torsional stiffness of said tube to prevent rotational movement of said stylus, and a plurality of electromechanical transducers coupled to said tube.

20. A phonograph pick-up device according to claim 19, wherein said anchoring support means includes means for restraining motion of said tube along its axis.

21. In a pickup device as claimed in claim 18, said two guide links extending in different directions relatively to and under equal angles to the axis of the stylus.

22. In a pickup device as claimed in claim 21, said two guide links forming with said two drive links a chain with two pairs of parallel opposite links.

23. In a phonograph pickup device for playing back a record groove containing two different record undulation sequences extending along different transverse segments of the groove, a stylus arranged to engage the record groove and to be driven by both its undulation sequences in different transverse planes, and a transducer system including at least two mechano-electric transducer elements each having a movable transducer drive portion through which the motion of the stylus is transmitted to the respective transducer element, a mounting structure carrying said two transducer elements in their operative position so that their drive portions may be driven by said stylus, a coupling link structure connecting said two transducer drive portions to said stylus and supporting said stylus for vibration simultaneously in said different planes in accordance with corresponding different motion components of said stylus, said link structure comprising a chain of at least four link arms and arm junctions pivotally joining adjacent ends of said link arms into an endless link chain, a driving connection from said stylus to one arm junction of said endless link chain for transmitting the driving motion of said stylus in said different planes to the two link arms extending from said one stylus-driven arm junction, the opposite ends of said two link arms extending from the stylus-driven arm junction being connected to the respective transducer drive portions of said two transducer elements for generating therein distinct signal sequences corresponding to the distinct component motions of the stylus in the respective different planes.

24. In a pickup device as claimed in claim 23, a portion of each of the respective two transducer elements forming at least a part of said links chain through which said transducers elements are connected to said stylus.

25. In a vibration transducing device, a stylus arranged to cooperate with a record member operating with groove undulations representing a record, a transducer system including at least two mechano-electric transducer elements each having a motion-transmitting connection to said stylus and operative to transduce mechanical motion transmitted between the stylus and the respective transducers into electrical signals, a mounting structure carrying said transducer system and said stylus in their operative positions, said stylus being supported by said mounting structure for vibration simultaneously in two different planes, said transducer system having two relatively rigid drive links, one for each transducer element, with each drive link having a pivotal motion-transmitting connection to said stylus and a guided portion at a distance from said stylus for transmitting motion between said stylus and its transducer element, two distinct elements of said transducer system forming two relatively rigid guide links with one guide link for each drive link having a pivot portion pivotally connected to the guided portion of its drive link and a further pivot portion pivotally connected to said mounting structure, said two drive links and said two guide links constituting a link chain of at least four pivotally connected links carried by said mounting structure and operative to control and confine the motion of each drive link to a distinct direction irrespective of the amplitude of the motion transmitted therethrough between the transducer and said stylus.

26. In a vibration transducing device as claimed in claim 25, said four pivotally connected links forming sections of a common integral link structure.

27. In a vibration transducing device as claimed in claim 25, said four pivotally connected links forming link sections of a common integral link structure with all links pivotally joined into an endless link chain.

28. In a vibration transducing device as claimed in claim 25, said four pivotally connected links forming sections of a common integral link structure, said two drive links extending in different directions from and under equal angles to the axis of the stylus.

29. In a vibration transducing device as claimed in claim 25, said two guide links extending in different directions relatively to and under equal angles to the axis of the stylus.

30. In a vibration transducing device as claimed in claim 25, said two guide links extending in different directions relatively to and under equal angles to the axis of the stylus and forming with said two drive links a chain with two pairs of parallel opposite links.

31. In a vibration transducing device as claimed in claim 25, a portion of each of the respective two transducer elements forming one link of the link chain through which said transducer elements are connected to said stylus.

32. In a sound-recording device, a stylus for forming a record groove in a record member, and a transducer system including at least two mechano-electric transducer elements each having a motion-transmitting connection to said stylus and operative to transmit to said stylus motions corresponding to a distinct sequence of electric signals impressed thereon, a mounting structure carrying said transducer system and said stylus in their operative positions, said stylus being supported by said mounting structure for vibration simultaneously in two different planes, said transducer system having two relatively rigid drive links, one for each transducer element, with each drive link having a pivotal motion-transmitting connection to said stylus for transmitting motion of its transducer element to said stylus and a guided portion at a distance from said stylus, two distinct elements of said transducer system forming two relatively rigid guide links with one guide link for each of the two drive links having a pivot portion pivotally connected to the guided portion of its drive link and a further pivot portion pivotally connected to said mounting structure, said two drive links and said two guide links constituting a link chain of at least four pivotally connected motion-transmitting links carried by said mounting structure and operative to confine the motion of each drive link to a distinct direction irrespective of the amplitude of motion transmitted therethrough by its transducer element to said stylus.

References Cited in the file of this patent

UNITED STATES PATENTS

| | | |
|---|---|---|
| 2,027,168 | Harrison | Jan. 7, 1936 |
| 2,055,187 | Vieth | Sept. 22, 1936 |
| 2,105,916 | Harrison | Jan. 18, 1938 |
| 2,114,471 | Keller et al. | Apr. 19, 1938 |
| 2,373,181 | Fleming | Apr. 10, 1945 |

FOREIGN PATENTS

| | | |
|---|---|---|
| 1,003,463 | Germany | Feb. 28, 1957 |